United States Patent [19]

Staar

[11] 3,945,040

[45] Mar. 16, 1976

[54] PUSH-PUSH LOCKING AND RELEASE MECHANISM FOR TAPE CARTRIDGE PLAYERS

[75] Inventor: Marcel Jules Helene Staar, Brussels, Belgium

[73] Assignee: Staar Development Company, S.A., Brussels, Belgium

[22] Filed: Jan. 29, 1975

[21] Appl. No.: 545,197

[30] Foreign Application Priority Data
Feb. 15, 1974  Belgium .............................. 811065

[52] U.S. Cl. ......................... 360/137; 242/55.19 A
[51] Int. Cl.² ................... G11B 15/24; B65H 17/48
[58] Field of Search .............. 360/137; 242/55.19 A; 274/42 R

[56] References Cited
UNITED STATES PATENTS

| | | | |
|---|---|---|---|
| 3,485,500 | 12/1969 | Loeschner et al. .................. | 360/197 |
| 3,603,743 | 9/1971 | Ban .............................. | 242/55.19 A |
| 3,633,920 | 1/1972 | Ban .............................. | 242/55.19 A |
| 3,765,685 | 10/1973 | Harlan et al. ....................... | 360/137 |

Primary Examiner—Daryl W. Cook
Attorney, Agent, or Firm—Wolfe, Hubbard, Leydig, Voit & Osann, Ltd.

[57] ABSTRACT

A tape deck locking and release mechanism for tape cartridges which is operable by manual movement of the cartridge. In response to a manual insertion and first push, a locking assembly carried by the frame catches a locking member associated with the cartridge to lock the cartridge in the playback position. When the cartridge is pushed a second time beyond the playback position the locking assembly releases and the cartridge is returned by a return spring and ejected. Alternative constructions for the locking assembly are disclosed, and also illustrated is an automatic release and ejection responsive to the tape completing its movement from one spool to the other in a cassette type cartridge.

12 Claims, 27 Drawing Figures

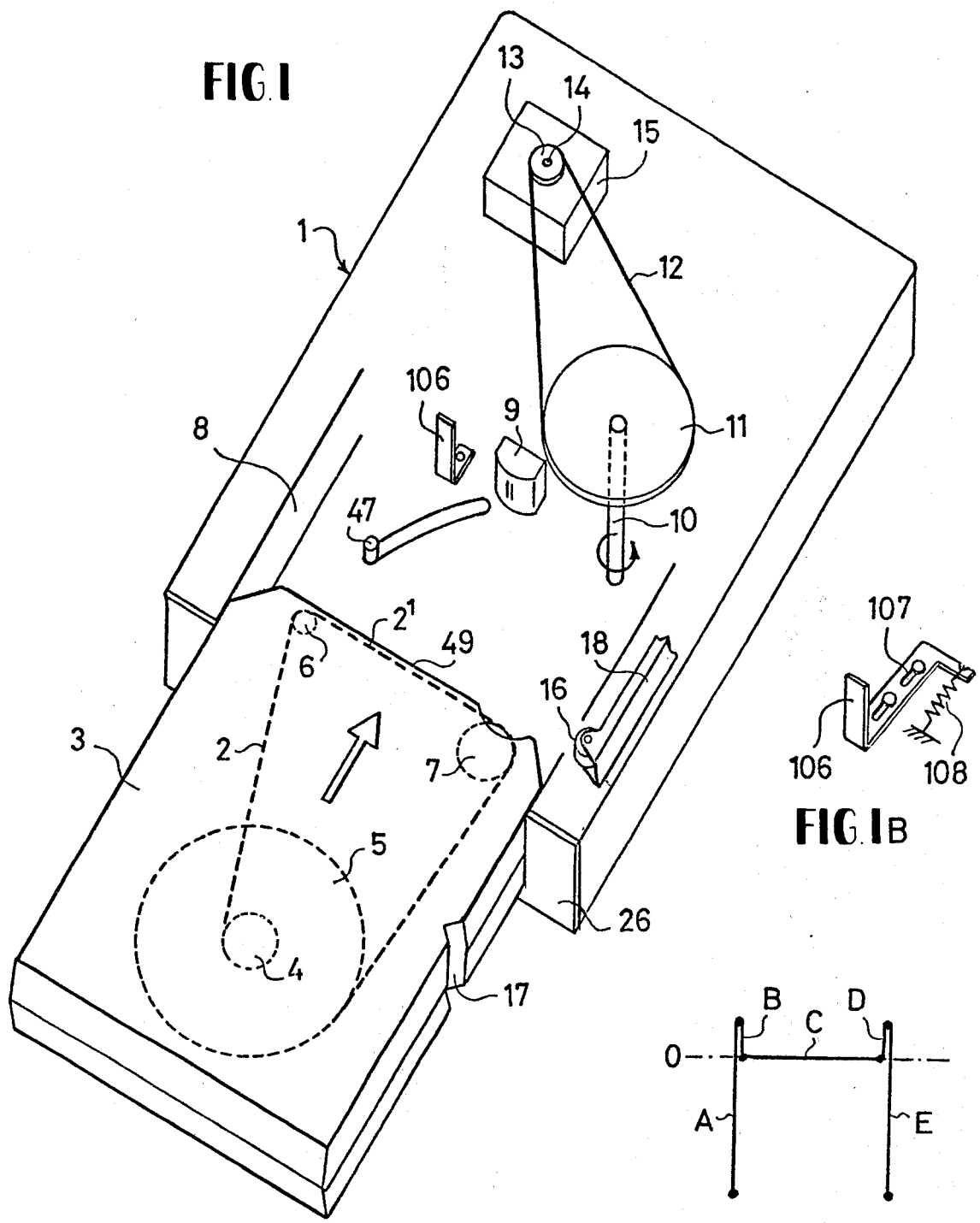
FIG.1
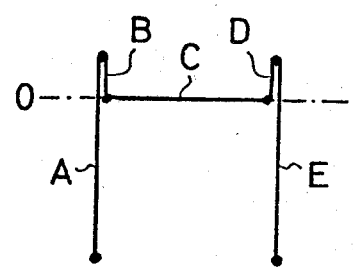
FIG.1B
FIG.1A

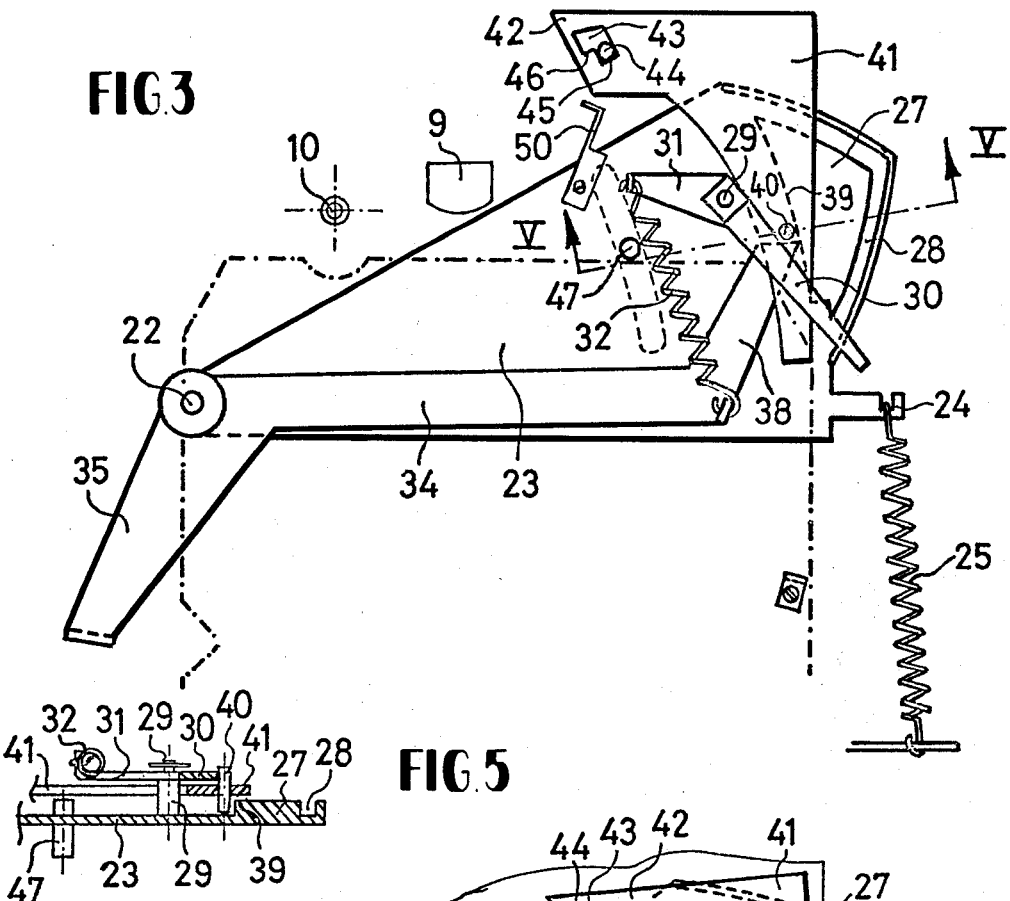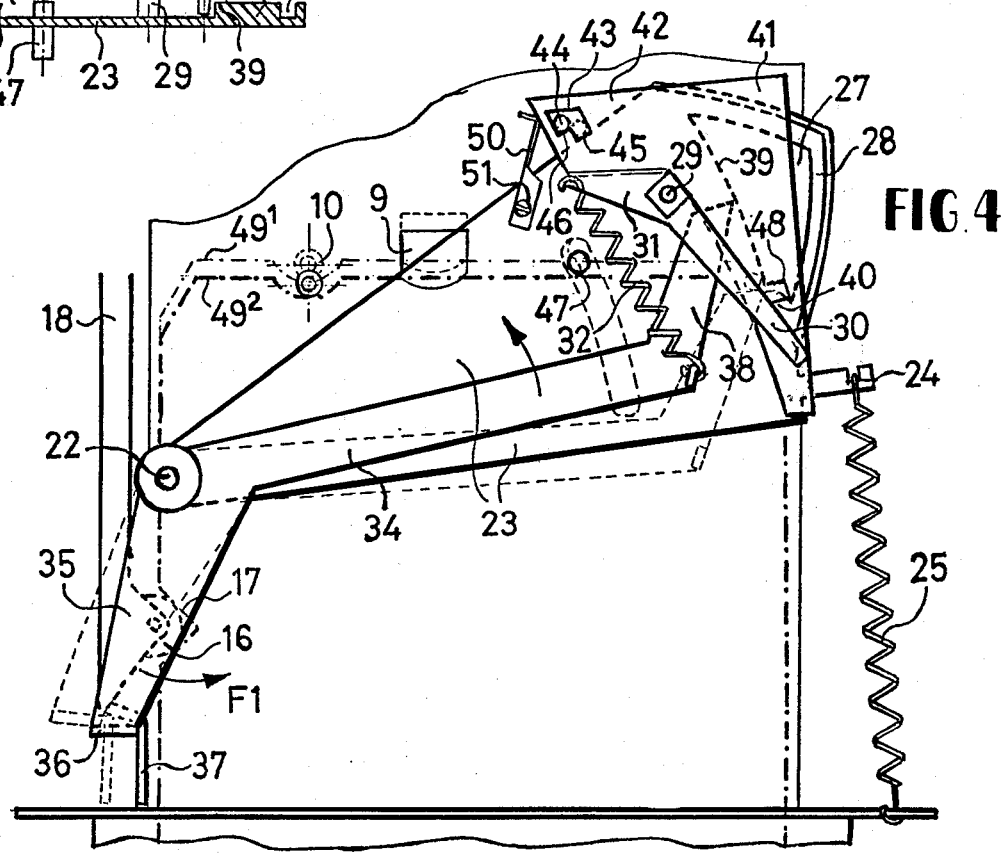

FIG.17
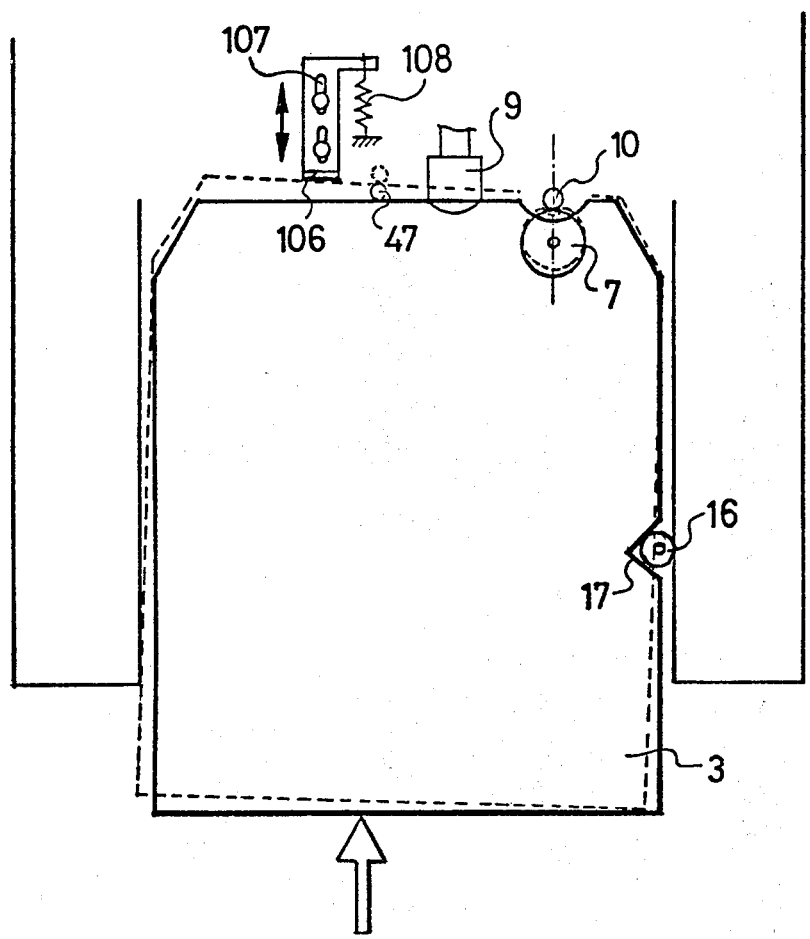
FIG.19
FIG.18
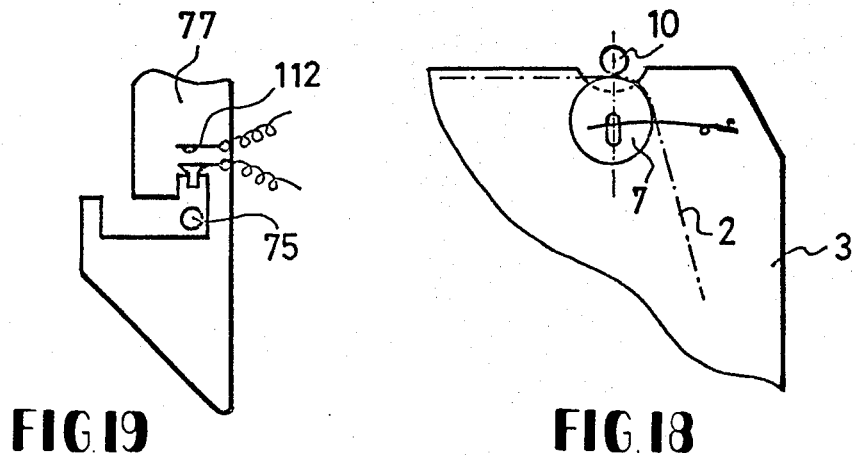

PUSH-PUSH LOCKING AND RELEASE MECHANISM FOR TAPE CARTRIDGE PLAYERS

The invention relates to devices for playing back data recorded on a magnetic tape in a cartridge or cassette, the devices being formed with a channel which receives the cartridge or cassette and in which the cartridge can be held during playback.

Some known cartridges or cassettes contain magnetic tape and their casing is provided with slanting portions and/or slots so that, when a cartridge or cassette is inserted into a recess provided in a playback device, the energy used for manual insertion is stored in a spring and maintains the cartridge in its operating position; furthermore, some of the energy is used to maintain the required pressure between the cartridge assembly and the capstan and to maintain the relative position between the elements so that the tape is suitably driven and the data are suitably reproduced.

The slanting portions on the cartridges are very small, so that a manual force has to be exerted over a relatively short distance when the cartridge is inserted or withdrawn from a playback device, so that the force required is relatively large and the operation is difficult.

One object of the invention is to reduce the force required and/or the difficulty of manual insertion and ejection from the playback device.

Another object is to provide a device wherein, when certain kinds of cartridges are used, they do not substantially project beyond the front surface of the device and are consequently less dangerous, e.g. during use in a motor vehicle.

Another aim of the invention is to provide a cartridge or cassette retaining device which, when in its operative position, enables use to be made, if required, of an automatic stop device requiring only a little mechanical energy, so that the elements can be separated by withdrawing a little energy from the energy already present in the device.

To this end, the device according to the invention is essentially characterized in that it comprises apparatus or means for pushing the cassette or cartridge beyond its operating playback position so that the device by a first push is placed in a first position in which it locks and retains the cartridge or cassette in a playback position, and by a second push is placed in a second position in which it unlocks and rejects the cartridge.

Various embodiments of the invention are shown in the accompanying drawings, in which:

FIG. 1 is a general perspective view of a cartridge playback device;

FIG. 1A is an explanatory diagram;

FIG. 1B shows a detail of an embodiment;

FIGS. 2, 3 and 4 are plan views from below of the apparatus in three different positions, showing the operating mechanism thereof;

FIG. 5 is a section along line V—V in FIG. 3;

Figure 6:
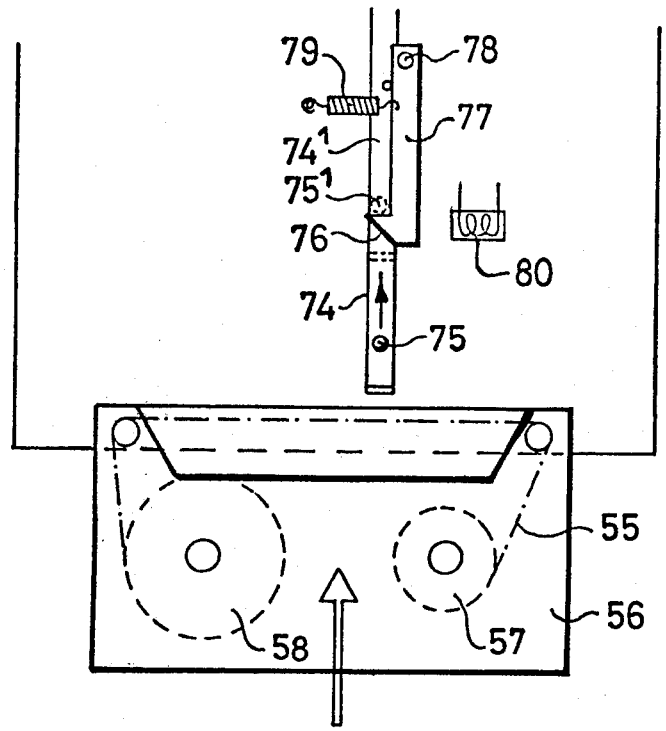
Figure 7:
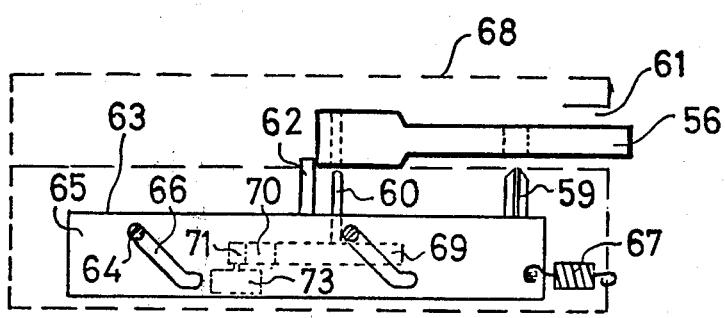
Figure 8:
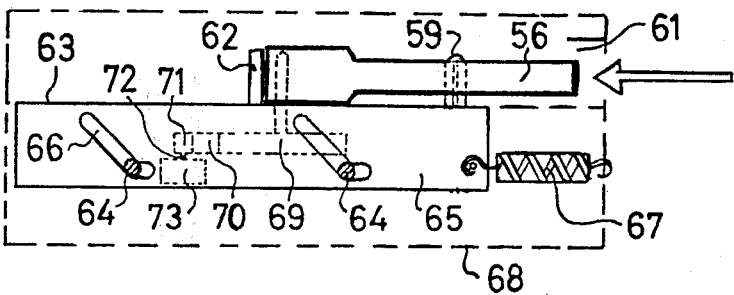
Figure 8A:
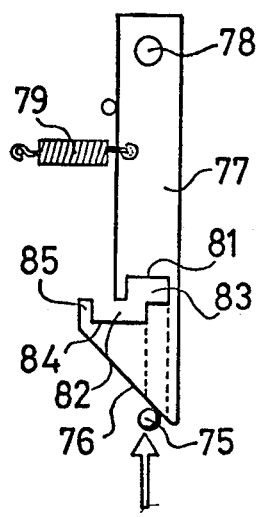
Figure 8B:
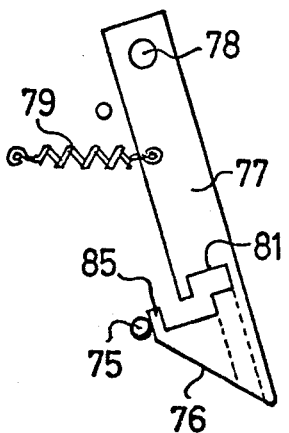
Figure 8C:
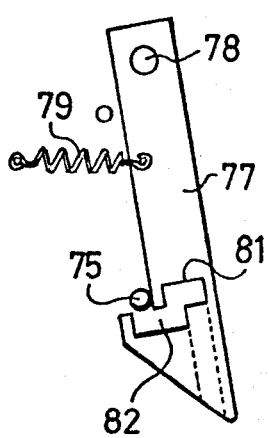
Figure 8D:
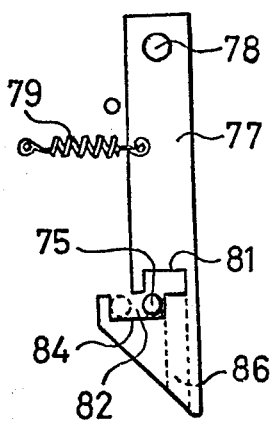
Figure 8E:
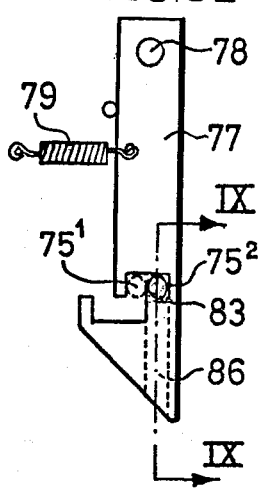
Figure 8F:
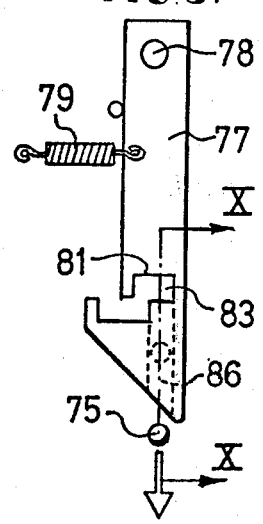
Figure 9:
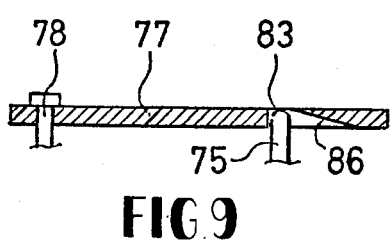
Figure 10:
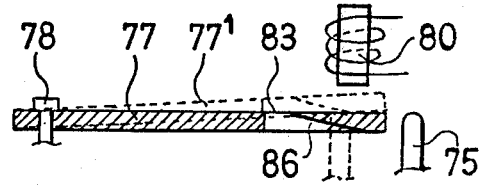
Figure 11:
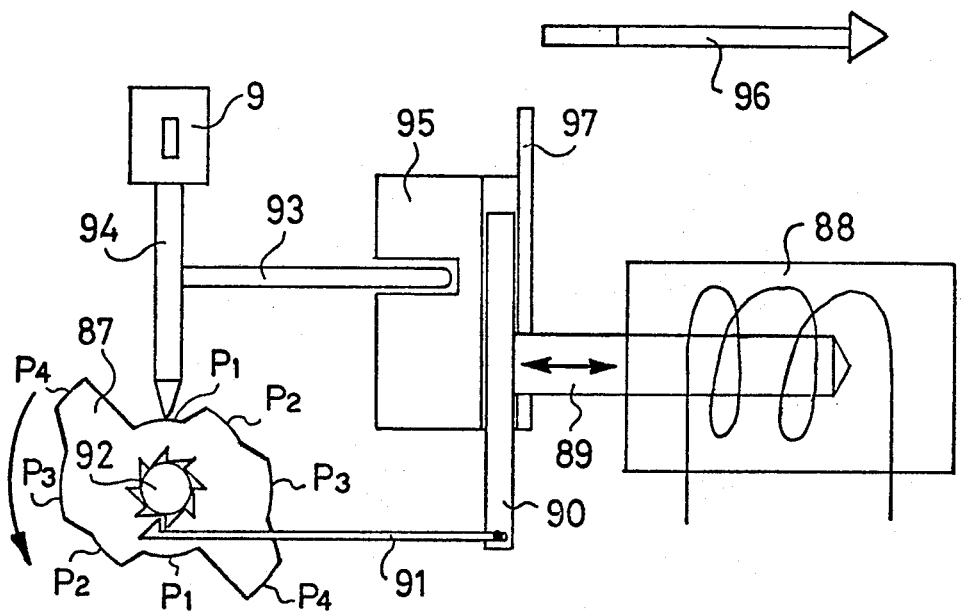
Figure 16:
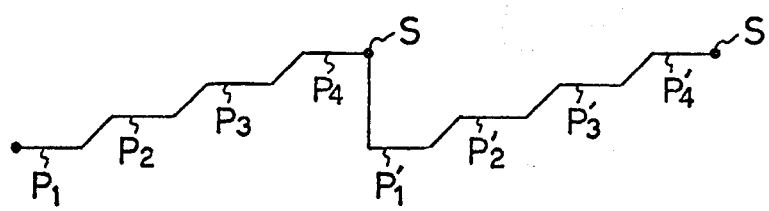

FIGS. 6, 7 and 8 refer to a embodiment relating to cassettes or cartridges wherein the magnetic tape unwinds from a spool and winds on to another spool, and vice versa;

FIGS. 8A to 8F are explanatory diagrams;

FIGS. 9 and 10 are sections along lines IX and X respectively in FIGS. 8E and 8F;

FIGS. 11 and 16 refer to a modified embodiment wherein automatic stopping is produced by moving the magnetic head or tape reader, and FIGS. 17, 18 and 19 show details of variants.

In the drawings, FIG. 1 shows a casing or frame 1 of a known device for playing back an endless magnetic tape 2 in a cartridge 3, the tape unwinding off a spindle 4 and winding along its outer diameter 5 and guided by rollers 6, 7.

The casing or frame 1 has means for movably supporting the tape cartridge, herein shown as a recess 8 into which the cartridge is slid so that tape 2 can be read out by magnetic head 9 making contact with the part $2^1$ of the tape 2 and so that tape 2 is driven by a capstan 10 which grips it in conjunction with a roller 7. Capstan 10 is rotated by a pulley or control wheel 11 and a belt 12 driven by a gearwheel 13 keyed to a shaft 14 of a motor 15.

Figure 2:
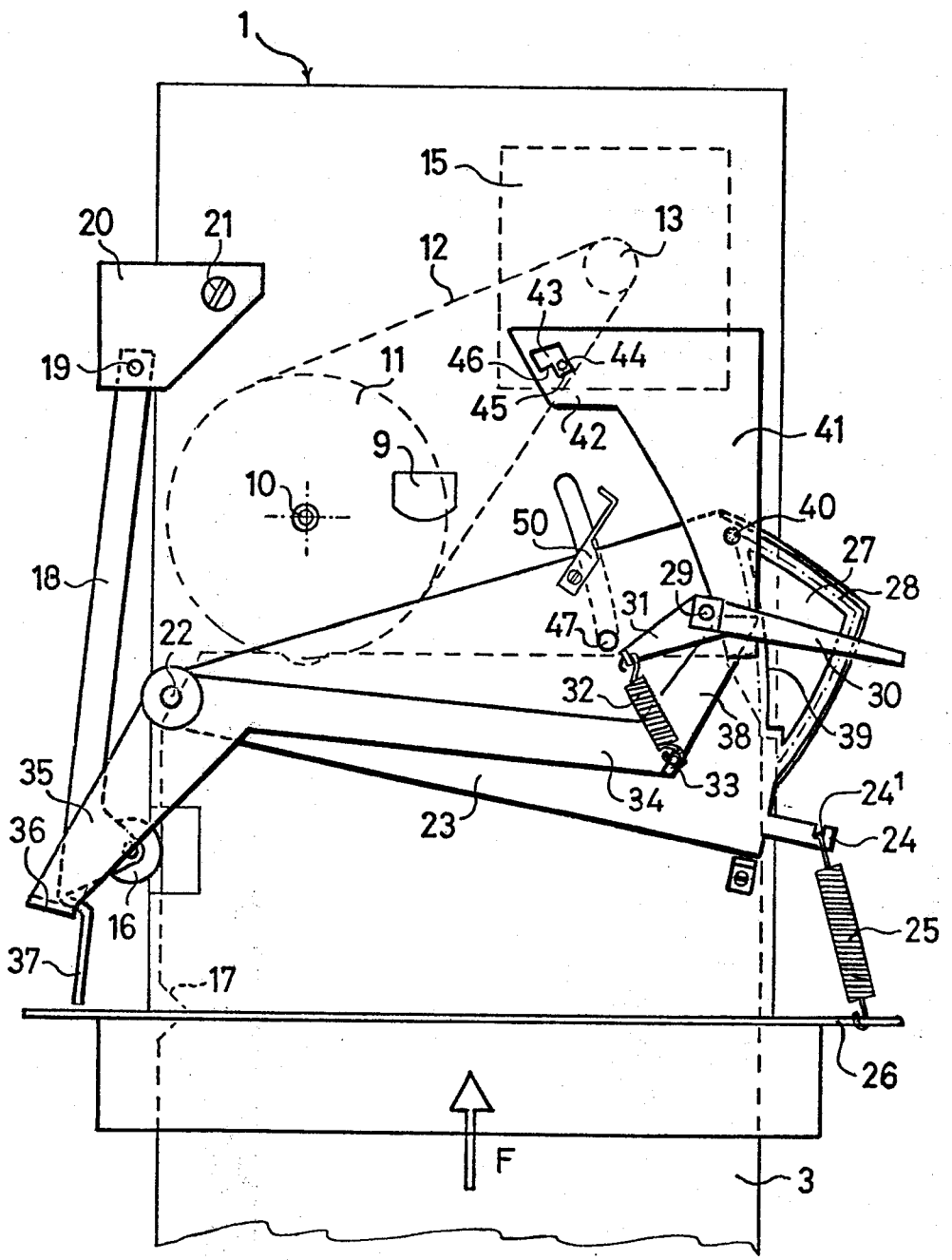

In the example shown, cartridge 3 is held in the operative position by a locking assembly comprising a roller 16 (FIGS. 1 and 2) which can engage in a slot 17 formed in a side surface of the cartridge, roller 16 is at the end of a lever 18 pivotable around a spindle 19 carried by a plate 20 secured by a screw 21 to casing 1 (FIG. 2).

A substantially triangular plate 23 is pivotally mounted on a spindle 22 borne by frame 1, the apex of the triangle being on the side of lever 18 and the triangle extending from one side of the casing to the other. On its side remote from the spindle 22, plate 23 bears a pin 24 extending towards the casing exterior and formed with a slot $24^1$ in which a spring 25 is secured, the other end of the spring being secured to a flange 26 forming part of casing 1 and disposed near the aperture for inserting cartridge 3 (arrow F in FIG. 2).

On the side remote from its apex, plate 23 is prolonged beyond the edge of the casing by a part having a cam-shaped thickened portion 27 (FIGS. 2 and 5). Along its outer edge, the cam has a groove 28.

Near cam 27, plate 23 bears a spindle 29 on which is mounted a cranked lever having an arm 30 which overhangs cam 27 and an arm 31 to which is hooked a spring 32, the other end of which is secured to a pin 33 borne by a Z-shaped lever 34 which extends above plate 23 and can also pivot around spindle 22. An arm 35 of lever 34 can act via a flange 36 on a lug 37 borne by lever 18. The other arm 38 of lever 34, the purpose of which will be explained hereinafter, extends to near cam 27.

A rod 40 can move in the groove 28 along the inner edge of the thickened portion 27. Rod 40 is secured to a substantially triangular plate 41 the apex of which faces the edge of the casing bearing the aperture for inserting the cartridge and the base of which has a projecton 42 formed with a slot 43 receiving a rod 44 secured to the casing. Slot 43 comprises two notches 45–46 such that rod 44 can occupy two different positions in slot 43.

Plate 23 has an abutment 47 which projects downwards so as to meet the front edge of cartridge 3 when the latter is inserted.

Operation is as follows:

When cartridge 3 is inserted, its front edge comes into contact with abutment 47 and causes plate 23 to pivot around spindle 22; since spindle 29 is borne by plate 23, it causes together to pivot cranked lever 30–31 the arm 30 of which comes at a given moment to touch the upper part of rod 40 and pivots lever 30–31 around spindle 29, first into the position in FIG. 3 where it stretches spring 32, and subsequently into the position in FIG. 4.

When plate 23 pivots, the rod 40 secured to plate 41 is guided by its lower portion along edge 39 of thickened portion 27, during which movement rod 40 is met by the end of arm 38 of lever 34 (FIG. 3) which thus abuts rod 40.

When plate 23 continues to pivot from the position in FIG. 3, lever 34 is retained until (FIG. 4) rod 40 is pushed by the cranked lever 30–31 into a slot 48 (FIG. 4) in thickened portion 27. At this instant, lever 34 is no longer retained by rod 40 and pivots around spindle 22 under the action of spring 32; consequently the flange 36 of its arm 35 can act on lug 37 of lever 18 so as to engage roller 16 into slot 17 of cartridge 3.

At this instant, the front edge of the cartridge (FIG. 4) occupies a position $49^1$ slightly beyond the normal playback position $49^2$ owing, in the example described, to an assembly allowing slight movement of capstan 10 and head 9.

This assembly will be described hereinafter.

Next, cartridge 3 automatically returns to the normal playback position under the action of a return spring 25 which pivots plate 23 which drives cartridge 3 along a short return track corresponding to the distance between positions $49^1$ and $49^2$.

During this short movement, component 41 is driven from the position in FIG. 3 to the position in FIG. 4 and rod 44 is simultaneously forced by spring strip 50 into notch 46 of slot 43, so that component 23 is held in position.

The cartridge is then in its active playback position and is locked by roller 16, but is no longer acted upon by spring 25.

After the playback or at any desired instant, the operator pushes the cartridge in the insertion sense so that the front edge 49 of the cartridge again occupies position $49^1$. By the striking contact of the cartridge with the abutment 47 the plate 23 is caused to pivot until slot 48 releases rod 40, after which rod 40 moves in groove 28 under the action of lever 30–31, and is thus returned to the position in FIG. 2.

Since lever 30–31 is no longer held by rod 40, it returns to its inoperative position in FIG. 2, pivots and releases the tension on spring 32; lever 34 is also released and no longer holds roller 16 in the locking position.

Under the action of spring 25, plate 23 rotates around spindle 22 in the clockwise direction, so that abutment 47 acts on the cartridge, which is ejected.

Meanwhile, spring 50 has stopped acting on projection 42 of component 41, so that rod 44 again engages in notch 45 and returns to its starting position.

FIG. 1A diagrammatically shows the sequence of different phases, as follows:

A - insertion of the cartridge or cassette by pushing it into a position slightly beyond the playback position O.

B - automatic return corresponding to an amount equal to the distance between the cartridge or cassette positions and the other elements.

C - playback.

D - unlocking, by pushing the cartridge on a distance corresponding about the same distance as in phase B, and E - ejection.

FIGS. 6, 7 and 8 relate to an embodiment applicable to a device for automatically reproducing data from a cartridge 56 of a kind known as a cassette and containing a magnetic tape 55 unwinding from a spool 58 and winding on to a spool 57 or vice versa. A spool driving spindle 59 and a capstan 60 may enter alia penetrate into cassette 56. The term "cartridge" as used in the claims includes both such spool tape storage devices, such as shown in FIG. 1 and two spool devices of the type illustrated in FIGS. 6–8.

Cassette 56 is inserted into a channel 61 in the device and abuts a rod 62 which it drives at the same time as a movable plate 63 which, with respect to the casing of the device, can be moved by stationary pins 64 towards the plane in which the cassette moves, so that the movable frame moves on slides 66 with which the movable plate is provided.

Assembly 63–65 is acted upon by a return spring 67 secured to the casing 68.

Capstan 60 is actuated by a pulley 69, a belt 70 and a pulley 71 keyed to the shaft 72 of a motor 73.

During its motion, cassette 56 drives a sliding bar 74 (FIG. 6) bearing a pin 75 which can act on the inclined surface 76 of a catch 77 which can pivot around a spindle 78 and is acted upon by a spring 79.

Catch 77 can act as a retaining catch when the sliding bar has been brought by the cassette into position $74^1$–$75^1$.

At the desired instant, catch 77 releases bar 74, either manually or via a solenoid 80.

It will now be given an example wherein the invention is applied to a device of this kind.

Catch 77 is constructed (FIGS. 8A–8F, 9, 10) for successive movement in horizontal and vertical planes so that when the cartridge is pushed slightly beyond the playback position, catch 77 can take up the required positions with respect to pin 75.

The catch 77 has a slot 81 comprising two notches 82–83; the bottom of notch 82 is prolonged towards the exterior of the catch and ends in an upwardly extending projection 85 which is continued downwardly by the inclined surface 76 of the catch.

FIGURE 8A

When the cassette is pushed, pin 75 acts on the inclined outer surface 76 of catch 77 and causes the same to pivot horizontally around spindle 78; at the end of the pivoting, pin 75 occupies the position in FIG. 8B where it is in contact with the outer surface of projection 85.

This position corresponds substantially to the normal playback position.

FIGURES 8C and 8D

By the continuation of the sliding motion beyond the last-mentioned position, pin 75 first occupies the position in FIG. 8C (slightly beyond the normal operating position) and then occupies the position in FIG. 8D, where pin 75 engages notch 82 and catch 77 has rocked under the action of spring 79.

This position (FIG. 8D) corresponds to the playback position.

FIGURES 8E and 8F

At the end of playback, the cassette is pushed forward again and pin 75 first occupies position $75^1$ and then, in a consequence of the pivoting of the catch 77 under the action of spring 79, occupies position $75^2$ in notch 83.

In position $75^2$, pin 75 is opposite a slope 86 enabling pin 75 to move towards the tip of the catch, which is cammed upwards in a vertical plane so that pin 75 is released (FIGS. 9 and 10) and the cassette is ejected by the return spring 47.

The catch 77 can release the pin 75 moving with the cartridge by the action of a solenoid 80 as normally provided in this kind of apparatus.

If required, a switch 112 (FIG. 19, corresponding to FIG. 8E) cooperating with catch 77 and pin 75 is switched on only when the cassette is pushed the second time, so that the cassette may be released for instance by electrical means.

An object of the invention, in the embodiment in FIGS. 1 to 5, is to take advantage of the small amount of energy required for triggering the mechanism by an automatic stop device. Advantageously it can be made use as triggering energy of a small part of the mechanical energy of the solenoid provided in the apparatus for positioning the magnetic head on the different tracks of the magnetic tape.

In the apparatus of the kind which has been described by way of example, using stereo 8 cartridges, the magnetic head 9 (FIG. 11) is positioned in conventional manner by a multi-level cam 87 under the action of a solenoid 88 actuated by a metal reference mark provided on the tape in order to bring the magnetic head successively on to tracks P1, P2, P3, P4.

FIG. 11 shows how the plunger 89 of solenoid 88 can attract an armature 90 on which a catch 91 is mounted so as to cause a ratchet wheel 92 bodily connected with the cam 87 to rotate and to move the magnetic head assembly 9 successively to levels P1, P2, P3, P4. The cycle loops in continuous manner, passing from position P4 to position P1 and so on.

According to the invention, position P4 is mechanically discriminated so that part of the mechanical energy of the solenoid is used at the end of playback of track P4 to trigger automatic stopping only during the changeover from position P4 to position P1.

To this end, for example, a component 95 slidable on armature 90 can be moved to different levels, by means of a lug 93 secured to rod 94 bearing head 9.

At each movement of plunger 89, the sliding component 95 accompanies armature 90 in the direction of arrow F.

Figure 12:
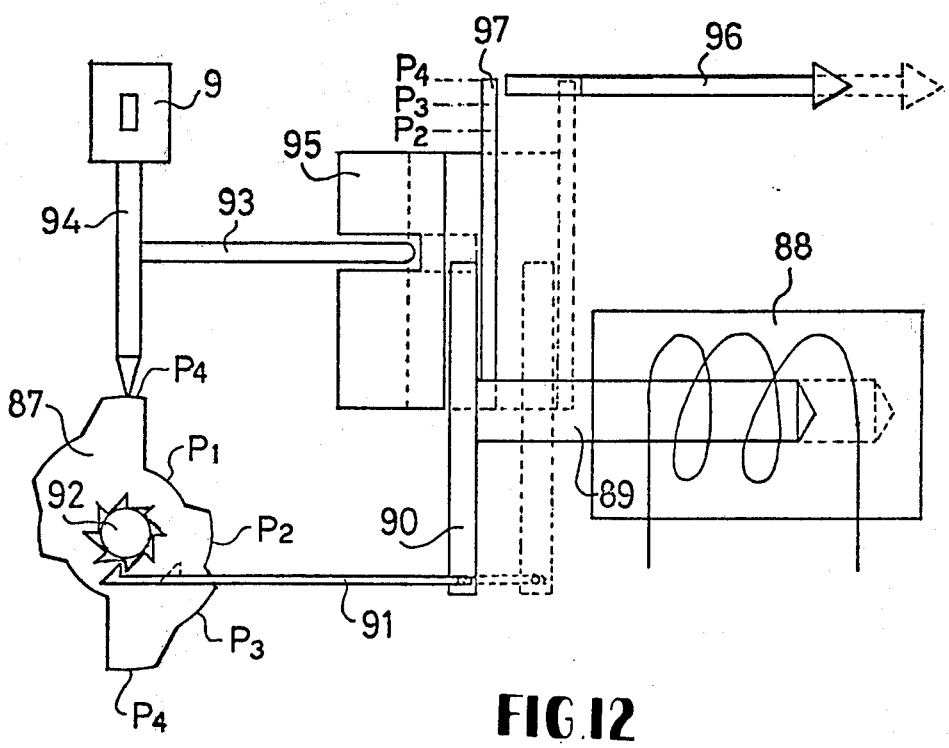

As shown in FIG. 12, a lever 96 can be driven by the solenoid movement only when a lug 97 of component 95 is in a position of the level P4 to pass to position P1.

Figure 14:
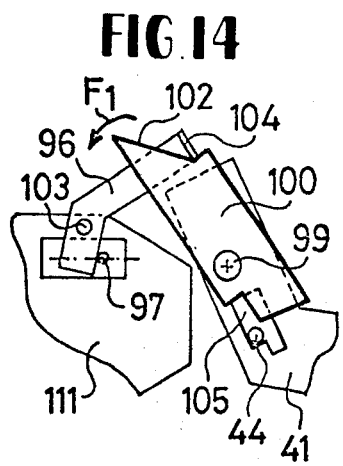
Figure 15:
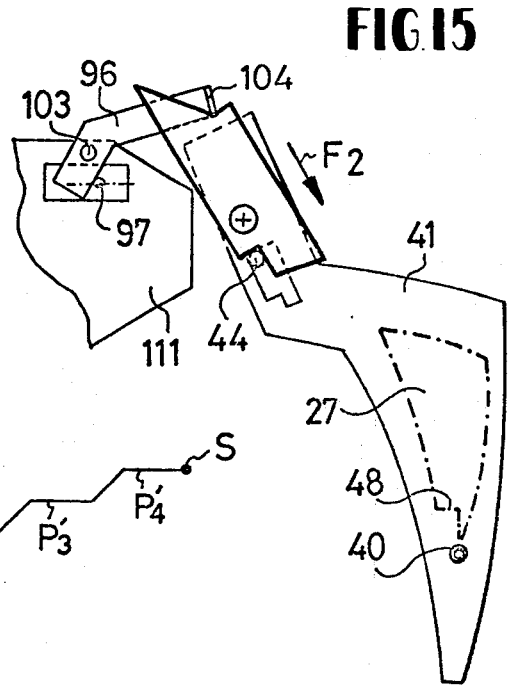

For the purpose of automatic stopping, the top part of plate 41 (FIGS. 13–15) is prolonged by an arm 98 on which a catch 100 pivots at 99. Catch 100 is adapted to maintain stud 41 in the position shown in FIG. 4 and prevent it from engaging in the prolongation of the window 101 provided for automatic stopping. Catch 100 has a slanting portion 102 with which lever 96 cooperates. At the instant when member 96 pivoting at 103 is driven by finger 97 of member 95 so as to bring about a automatic stoppage under the aforementioned conditions, a flange 104 secured to lever 96 acts on slanting portion 102, causes member 100 to pivot in the direction of arrow $F_1$ and opens a passage-way 105 for stud 44 (FIG. 14). Component 96 continues to move and now presses on the prolongation of plate 41 and pushes it in the direction of arrow $F_2$ (FIG. 15). Stud 40 of component 41 (FIG. 15) is no longer secured by slot 48 and member 41 tilts and triggers the apparatus as described in connection with FIGS. 2 to 5.

FIG. 16 is a diagram of the different levels P1, P2, P3, P4 successively occupied by the magnetic head. At a place S on level P4, stud 97 can enter into action so as to produce automatic stopping. The next cycle, after which another automatic stop occurs, is shown at P′1, P′2, P′3, P′4.

In accordance with the explanations given with reference to FIGS. 1 to 5, an important feature of the invention, as shown by graph 1A, is that the cartridge moves beyond its operating playback position.

This slight extra movement is used to move the mechanism into the right position, in a sufficiently reliable manner, so that it is alternately locked and unlocked at each push.

The additional motion can be varied in extent and with respect to the different components and depends upon the cartridge and the type of playback device used.

In the example in FIG. 1, the apparatus is normally provided with a stationary abutment 106 against which the front edge 49 of the cartridge abuts in the playback position. Roller 7 then bears against the capstan spindle 10 and is kept under pressure by wheel 16 in slot 17.

In this case additional travel may be obtained if abutment 106 is made movable (FIG. 1B). Slots 107 are provided so that component 106 can be pushed back and is subsequently returned by a return spring 108 to its abutting position where it brings the cartridge into the playback position.

Since capstan 10 is stationary and wheel 7 of cartridge 3 is relatively rigid, the cartridge both supplies the required travel and moves in a more resilient manner when the user presses the left part of the cartridge (FIG. 17).

A more uniform distribution of force can be obtained by mounting at least the capstan 10 in a similarly flexible manner.

Figure 13:
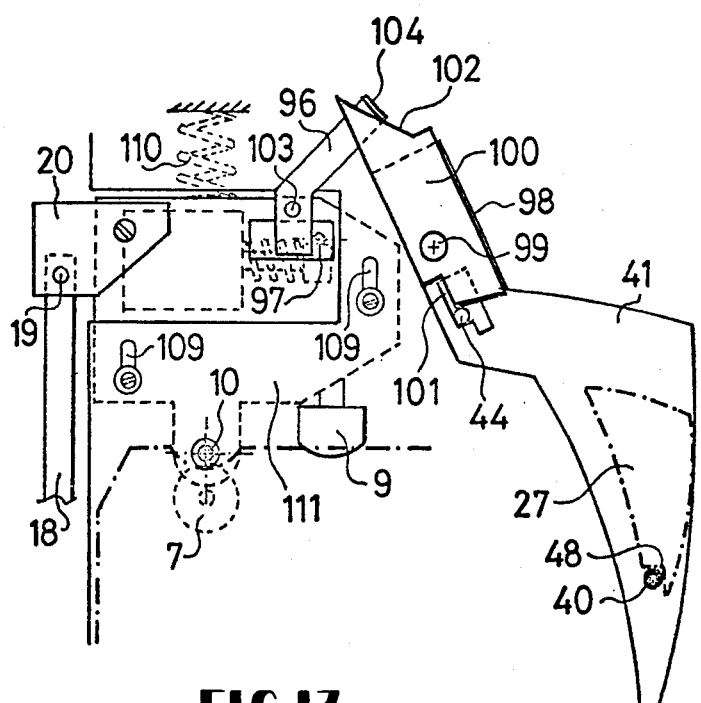

FIG. 13 shows how other elements, if required, can be temporarily pushed back by the pressure of wheel 7 of cartridges 3 into slots 109, a return spring 110 returning the capstan and consequently the cartridge into its playback position.

Some cartridges are provided with very flexible or spring-tensioned wheels 7, in which case other movable elements are of course unnecessary (FIG. 18).

If required, the locking assembly 16, 18, 19, 20, 21 can be mounted on a movable unit 111 (FIG. 13) and moves therewith, so that it does not have to overcome changes of pressure after wheel 16 has already been engaged in slot 17 (FIG. 4).

I claim as my invention:

1. A tape deck locking and release mechanism comprising, in combination, a frame carrying means for movably supporting a tape cartridge for movement into the frame toward and beyond a playback position in response to a manual insertion and push, a spring for imparting return movement to the cartridge, a locking member associated with the cartridge, a locking assembly carried by the frame for catching said locking member to lock said cartridge in the playback position when the cartridge is inserted and pushed beyond said playback position and returned by said return spring therefrom, means on said element cooperating with means on said member for releasing said locking member and unlocking the cartridge when the cartridge is manually pushed beyond said playback position from its locked playback position, and for enabling said return spring to eject said cartridge out of the frame.

2. A tape deck locking and release mechanism according to claim 1 which includes a component which is driven by the cartridge along at least part of the distance through which the cartridge is inserted into the frame, said component operating said locking assembly, and wherein said return spring stores energy during manual insertion and push, and returns a part of the energy when the cartridge is returned to and locked in its playback position, the spring returning another part of the energy when the cartridge is unlocked, so as to eject the cartridge.

3. A tape deck locking and release mechanism according to claim 2, in which said locking assembly comprises a lever and roller inserted into a slot in the cartridge, said assembly being carried by and movable with said movable component.

4. A tape deck locking and release mechanism according to claim 2 in which said locking assembly includes a pivotable retaining member operated by said return spring for releasing part of the energy stored during insertion of the cartridge when said cartridge is returned from beyond its playback position and locked in the playback position, and for releasing the remainder of the accumulated energy when the cartridge is unlocked to eject the cartridge.

5. A tape deck locking and release mechanism according to claim 1, in which said locking member comprises an abutment on the tape cartridge.

6. A tape deck locking and release mechanism according to claim 1 including a resiliently mounted capstan drive for the tape and the cartridge, movable with and accommodating the movement of the cartridge beyond the playback position.

7. A tape deck locking and release mechanism according to claim 1, in which the locking assembly includes a catch mounted for movement successively in two planes and having two main positions, a first position for retaining the cartridge, and a second position for releasing the cartridge.

8. A tape deck locking and release mechanism according to claim 7 in which said catch is formed with a slot comprising two notches corresponding to said first and second positions, said second notch having an inclined surface extendng toward the exterior of the catch and serving as a camming surface for moving the catch in one of said two planes to release the cartridge.

9. A tape deck locking and release mechanism according to claim 8 in which said locking member comprises a pin, and wherein said catch includes an outer inclined surface engageable by said pin for moving the catch in the other of said planes to position the catch for receiving the pin in the first of said notches, for locking said movable component and the cartridge in the playback position.

10. A tape deck locking and release mechanism according to claim 9 providing a push push locking and release mechanism in which upon insertion of the cartridge and a manual push beyond the playback position said pin engages the outer surface of the catch and rocks the catch in one plane and catches the pin in the first notch upon return movement of the pin and the cartridge and locks the cartridge in the playback position, and wherein upon a second push the pin is moved along said inclined surface extending towards the exterior of the catch to cam the catch in the other plane and release the pin to enable the return spring to eject the cartridge.

11. A tape deck locking and release mechanism according to claim 10 further including a solenoid for moving the catch in one of said two planes and releasing the pin for unlocking the cartridge.

12. A tape deck locking and release mechanism according to claim 8 further including a solenoid for moving the catch in one of said two planes of movement.

* * * * *